United States Patent [19]

Miller et al.

[11] 4,132,648

[45] Jan. 2, 1979

[54] BUOYANT FLUID SEPARATION DEVICE

[75] Inventors: Henry F. Miller, San Jose; Abraham Borts, Santa Clara; Folker H. Weiss, Cupertino, all of Calif.

[73] Assignee: Lockheed Missiles & Space Company, Inc., Sunnyvale, Calif.

[21] Appl. No.: 773,839

[22] Filed: Mar. 3, 1977

[51] Int. Cl.$^2$ ............................................. B01D 17/02
[52] U.S. Cl. ............................. 210/242 R; 210/242 S; 210/DIG. 25
[58] Field of Search ................. 210/242 R, DIG. 25, 210/DIG. 26, 221 R, 242 S

[56] References Cited

U.S. PATENT DOCUMENTS

| | | | |
|---|---|---|---|
| 3,338,414 | 8/1967 | Lefke et al. | 210/179 |
| 3,358,838 | 12/1967 | Kosar et al. | 210/242 |
| 3,576,257 | 4/1971 | Yates | 210/DIG. 25 |
| 3,612,277 | 10/1971 | Stavern et al. | 210/83 |
| 3,656,624 | 4/1972 | Walton | 210/242 |
| 3,731,813 | 5/1973 | Tipton | 210/242 |
| 4,021,344 | 5/1977 | Webb | 210/122 |

Primary Examiner—Charles N. Hart
Assistant Examiner—David R. Sadowski
Attorney, Agent, or Firm—Rodger N. Alleman; Billy G. Corber

[57] ABSTRACT

A device for separating essentially immiscible fluids such as oil from rough water which utilizes a drum-shaped mechanism having generally vertically disposed oleophilic discs rotatable about a horizontal oil receiving trough, the unit being mounted in a frame also providing a sump which allows rotation of the drum, the complete unit being able to follow wave motion substantially independently of a supporting vessel through use of slide and guide mechanisms providing fore and aft restraint while allowing freedom of movement in heave and roll independent of ship motions. A major portion of the interior area of the drum about which the oleophilic discs rotate is filled with buoyancy material.

10 Claims, 6 Drawing Figures

BUOYANT FLUID SEPARATION DEVICE

CROSS REFERENCES

Understanding the operation and structure of the invention herein described may be facilitated by consideration of U.S. Pat. No. 3,576,257 "Fluid Separation Device" issued to Robert L. Yates on Apr. 27, 1971. Reference is also made to U.S. patent application, Ser. No. 700,831 for a "Fluid Separation Device for Low Temperature Environments" filed June 29, 1976 by Henry F. Miller and Michael G. Hoard.

BACKGROUND OF THE INVENTION

In an increasingly industrialized world, the by-products and waste products of civilization present increasing hazards to a safe and useable environment. Contamination of rivers, lakes and oceans frequently occur because of "spills" of crude oil, refined products, fish oils, vegetable oils and other essentially fluid materials which, because of the differences in density surface tension, or other physical properties will, for relatively long periods of time, remain near the surface of or float upon the polluted waterway.

Inherently, a process or device for removing such pollutants should have utility in connection with controlled industrial separation processes where fluids of different viscosities, densities, and/or surface tension characteristics are to be separated one from the other. Though this application will be couched mainly in terms of removing "pollutants," it should be understood that its scope and intent is broad enough to include and cover separation of fluids of whatever kind that lend themselves to the mechanism described.

Removing materials from other fluid surfaces has heretofore been approached from a number of directions and has included the use of chemical dispersants, physical removal by mechanical means, the use of burning agents, the use of floating or sinking absorbent materials, and the like. For example, straw is sometimes employed to absorb oil from a water surface and the straw is later processed by burning, thus casting combustion byproducts (pollutants) into the atmosphere. The use of chemical dispersants is likewise usually undesirable since these materials often have an adverse effect upon the ecological balance of the environments in which they are used.

The aforementioned patent to Yates made a great step forward in providing an easily transportable and highly effective mechanism for recovering usable oil, thus allowing the oil to be recycled rather than transducing the pollution into another environment, e.g. the atmosphere or bottoms of bodies of water. There are instances such as foul weather environments in heavy seas or high wave situations where the Yates mechanism is not completely effective where for example, the roll or pitch of the recovery unit is not independent of supporting vehicle. Also, in extremely high wave situations water may enter into the trough area which in the Yate's device is located in the center of the discs and closer to the mean water surface.

DESIGN CONSIDERATIONS OF DISC TYPE RECOVERY SYSTEMS

At this point it would be practical to set forth some of the design considerations of a rotary disc type recovery mechanism with a center collection trough which confirm the desirability of the instant invention. We have found that there are certain practical and economic limits to the disc diameter and disc spacing of a device such as shown in the Yates patent. Since recovery rate is directly proportional to oil wetted area per unit time, maximizing this oil wetted area is desirable. Extensive testing has shown that for any given oil, incursion between two discs is effected by disc spacing. The closer the discs, the less the penetration of oil between the discs and therefore the less oil wetted area on the disc. Conversely, the further apart the discs are spaced, the greater the incursion of oil between the discs and therefore the greater the oil wetted area per disc, up to 100 percent, but fewer discs are possible per given drum length. Therefore, optimizing disc spacing and disc diameter is desirable to obtain maximum oil wetted area for a given length of assembly. Our test program determined that 4-ft diameter discs, spaced nominally 2 inches apart with a center aperture large enough to accommodate a trough which is sized to allow flow of the maximum anticipated amount of recovered oil, approached the design optimum in terms of oil wetted area for a given length and appropriate rotational speed.

Limitations of the Yates device are the flooding or ingestion of water into the trough when high waves are encountered and the inability of the device to respond rapidly to wave motion when mounted on a nonresponsive platform. A system has been developed in which the wave response characteristics of the entire assembly, i.e., the disc drum, its supporting structure, operating machinery and flotation is such that the flooding of the trough is minimized. However, these limitations preclude the use of the Yates device with large stable platforms such as ocean-going vessels and the like. These limitations are overcome in the instant invention by making the disc drum of large diameter, e.g., 8 ft., including a center aperture of approximately 5 ft. which optimizes the wiped area and disc spacing as described above, moving the trough to the top of the aperture thereby providing greater ability to accommodate water level variations before encountering trough flooding, and by including buoyancy in the remaining aperture area which provides self-flotation and wave response capability relatively independent of the support platform. The mechanism is provided with novel mounting means which in considerable measure enables it to react as a unit to wave-caused motions independent of its supporting platform or vehicle. The mounting means has also been provided with a sump which allows recovered oil to be stored in selective amounts providing variable ballasting which will vary the action of the recovery drum, both from its position of riding the water surface, as well as effecting its responsiveness to wave action. The difference in magnitude and approach of the instant invention over that shown and described in the Yates patent will be realized when it is understood that in accordance with the design limitations mentioned above, the Yates device was practically limited to a diameter of approximately four feet. The instant invention can be designed to exceed eight feet in diameter. Its length can be varied, and discs added, to suit the requirements of a given application, or support platform configuration.

PRIOR ART

Applicants are aware of the following listed patents which would generally relate to the field of this invention though we believe that none of them teaches, individually or collectively, the features as claimed herein. The U.S. patents are:
Lee, No. 2,876,903
Earle, No. 3,259,245
Kosar et al. No. 3,358,838
Patent application, Ser. No. 700,831, filed 6-29-76 (Miller et al)

SUMMARY OF THE INVENTION

Rotary drum/disc oil recovery units have been found to be superior in most instances to other means of oil-water separation. Incidentally, as utilized herein, the terms "oil" and "water" are utilized representatively to include any type of relatively immiscible fluids, at least one of which will display oleophilic characteristics to materials immersed therein.

This invention describes such a device of a diameter on the order of twice that practical with other devices and which solves or highly minimizes the possibility of water intrusion in the oil pickup trough while providing a self-buoyed recovery mechanism, all of which is mounted in a novel mechanism for disposing the drum between two support members which may vary in lateral separation as rough seas are encountered, the mounting mechanism providing for an oil storage sump which allows the flotation characteristics of the unit to be controlled.

DESCRIPTION OF THE DRAWINGS

With the foregoing in mind, applicants have shown a preferred embodiment of the invention in the referenced drawings in which.

DESCRIPTION OF PREFERRED EMBODIMENT

Figure 1:
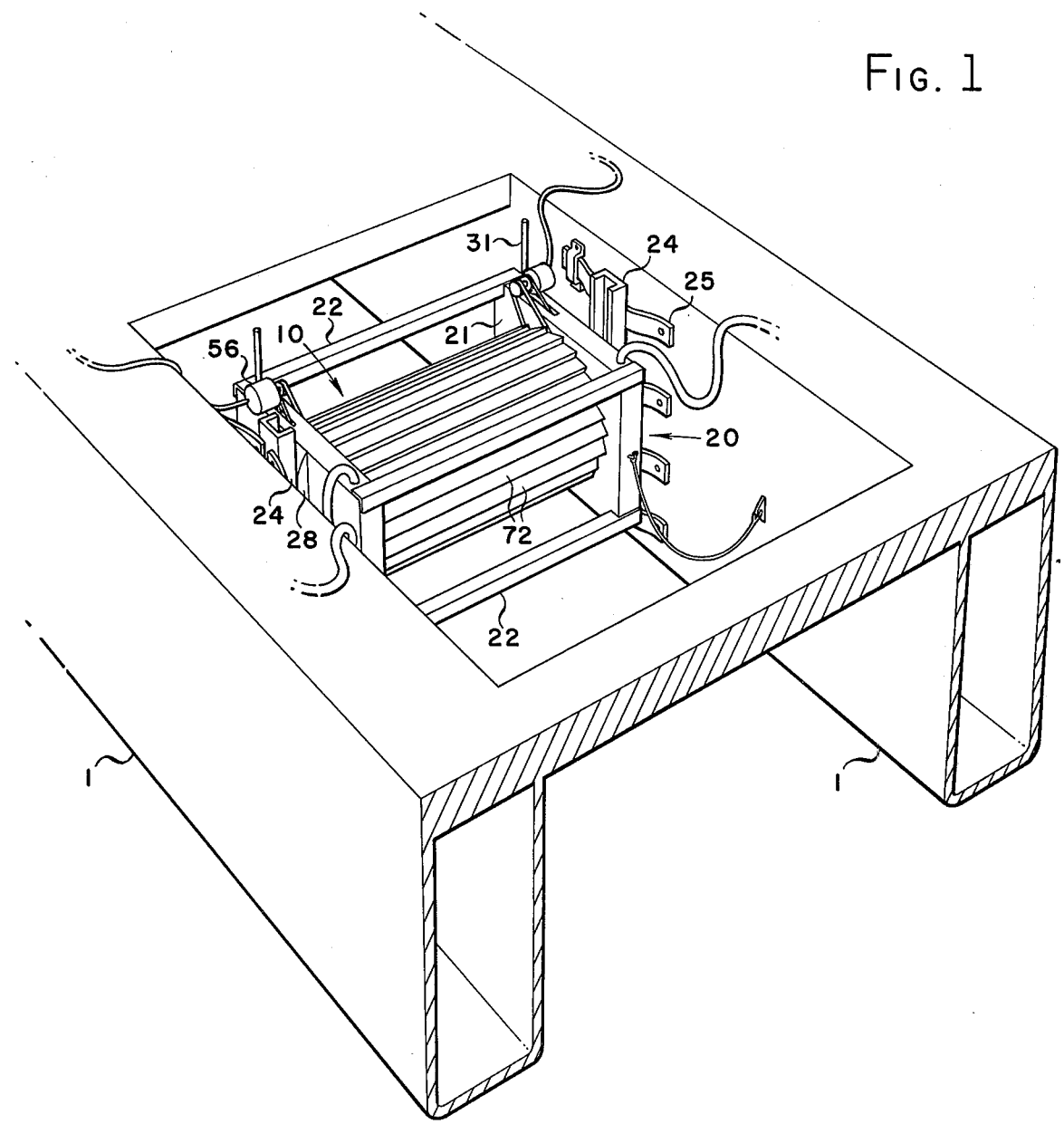
FIG. 1 is an isometric representation of an oil recovery device in accordance with the instant invention mounted between two catamaran hull members.

In view of the above information, a detailed explanation of the operation of the apparatus disclosed and described herein is as follows. It must first be recognized that the device operates by taking advantage of the forces of surface tension and adhesion, whereby a generally oleophilic surface is rotated through water or other material containing an oleaginous substance which is caused to adhere to the discs. As described in the Yates patent mentioned above, each surface of a rotating disc is provided with a wiper which operates to "scrape" or wipe oil off the surface of the rotating disc and cause it, by gravity, to be deposited into a trough where it is transported to a storage receptacle for further processing. As pointed out in the Yates patent, the utilization of vanes to hold the discs in place, and to furnish a relatively quiet space within the drum for the actual pickup operation to take place is desirable. With this operating principle in mind, reference is made to FIG. 1 of the drawing in which support members 1 are utilized to provide a mounting platform for the disc-drum unit 10. Support members 1 may be the hull of a ship, the twin hulls of a catamaran, or merely two generally vertical surfaces in a sluiceway through which polluted materials will pass. The device will be described with the assumption that support members 1 constitute, as one mode of utilization of the invention, the pontoons of a catamaran type vessel which, especially in heavy sea and wind conditions, are known to flex, with the distance between the two inner surfaces of the pontoons vary significantly. Disc drum unit 10 is mounted within a mounting frame 20 which is seen to consist of generally vertical end plates 21 which are rigidly separated from each other by means of horizontal members 22, the mounting frame 20 preferably being provided with horizontal members 22 in a manner which leaves the interior of the mounting frame 20 substantially open to the environment and accessible by polluted waters that will pass through it. Desirably, flow deflectors (not shown) may be provided to prevent by-pass flow between frame 20 and supports 1.

Mounting frame 20 is secured to support members 1 by means of mounting channels 24 which preferably are generally U-shaped in cross section, and which are, in turn, secured to support members 1 by means of leaf or other type springs 25. Leaf springs 25, in order to provide flexibility, are preferably rigidly secured at one end, and flexibly secured at the other so as to allow for expansion and elongation of leaf springs 25 as they may be compressed and released. This feature is best shown in FIG. 3 where a rigid mounting is provided at end 26 for leaf spring 25, and a flexible mounting is provided at the opposite end by means of spring mounting bracket 27.

Mounting frame 20 is secured within guides or mounting channels 24 by means of arcuate embossments or slides 28 which are secured to the end plates 21 and adapted to allow rotation of the disc drum unit 10 and mounting frame 20 within mounting channels 24. Preferably, the inner surface of mounting channels 24 and/or the outer surface of slides 28 may be coated with a low coefficient of friction material. Applicants have found that ultra high molecular weight polyethylene is admirably suited for this purpose.

Figure 2:
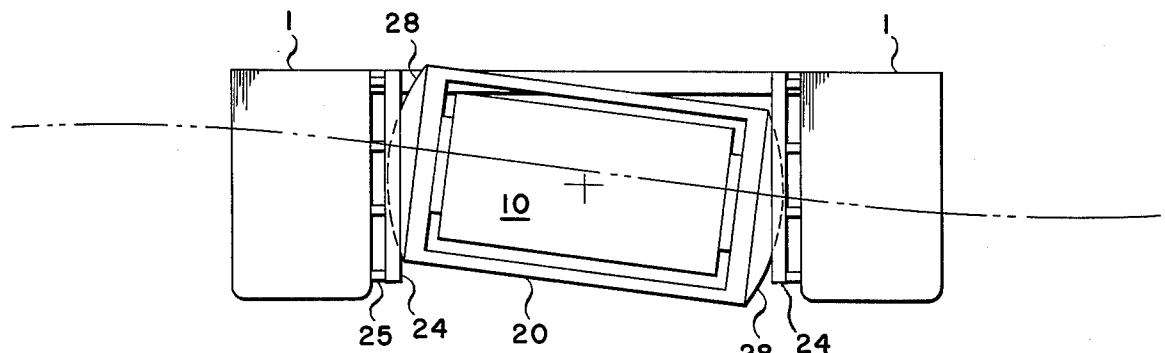
FIG. 2 is an elevational view of a recovery mechanism as shown in FIG. 1.

As best shown in FIG. 2, it will be seen that disc drum unit 10, within mounting frame 20, is free to rise and fall as a unit, and is also free to "rotate" or oscillate between support members 1 in such a manner that each end of the mounting frame can independently rise and fall within its mounting channel 24. Such mounting allows the recovery unit to react to wave and water motions considerably independent of supporting members 1 and thus "follow" the surface of water, resulting in improved efficiency of the unit by maintaining a more functional and constant contact with the surface of water, and pollutants thereon, than would otherwise be the case.

Figure 3:
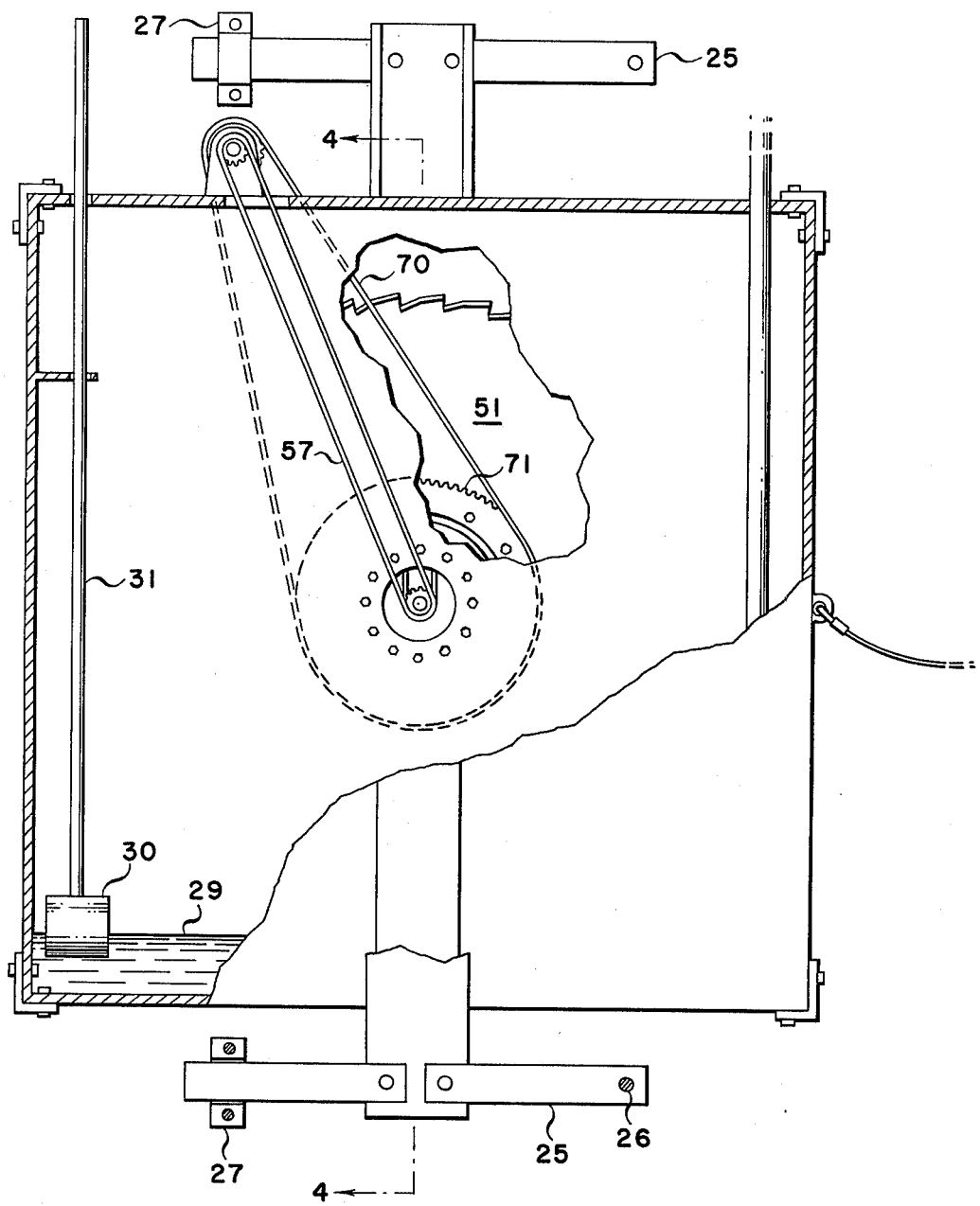
FIG. 3 is an end view, shown partly in section, of an oil separation device showing power means and frame mounting means for the separation device.
Figure 4:
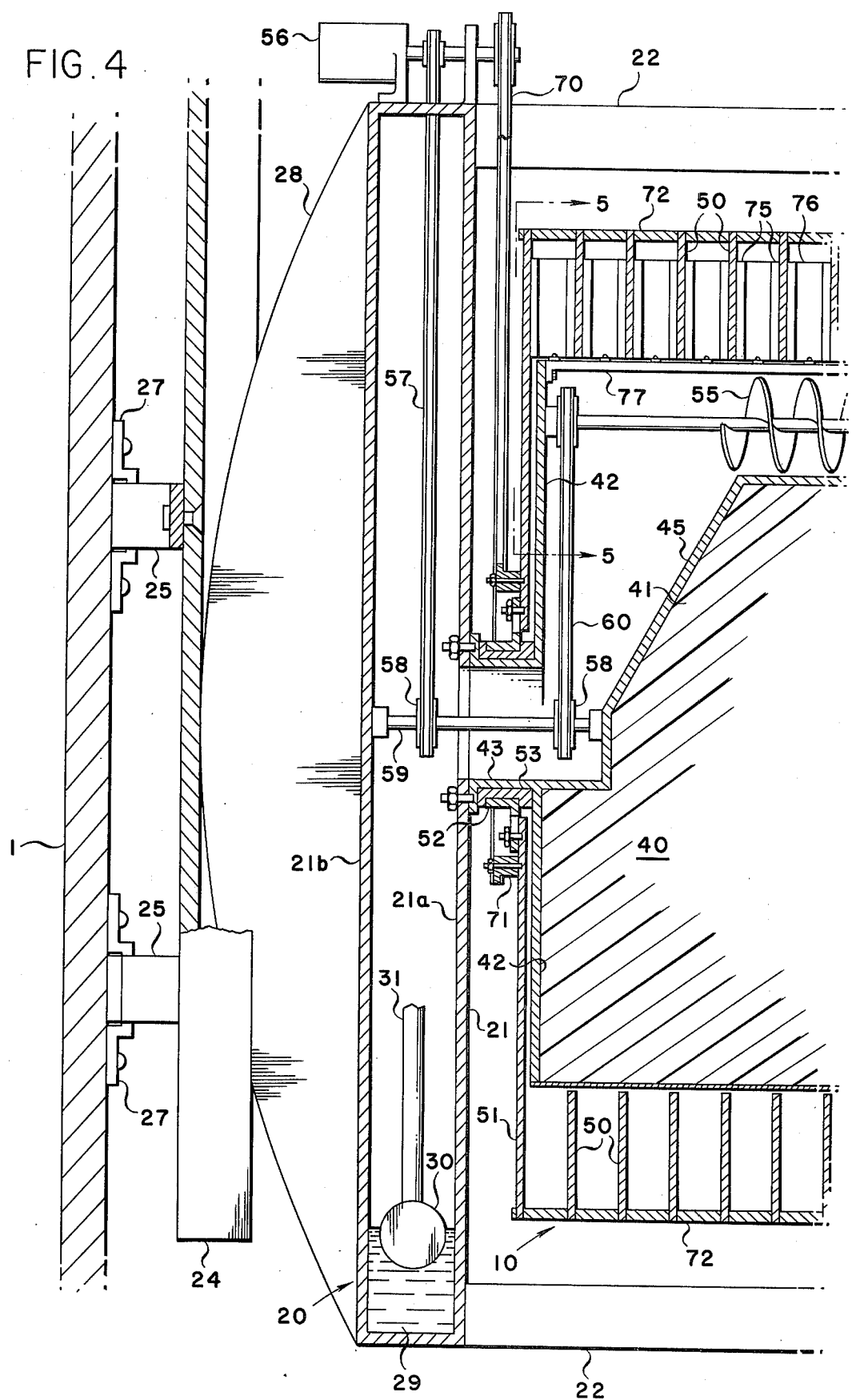
FIG. 4 is a view taken along line 4—4 of FIG. 3.

As best shown in FIGS. 3 and 4, end plates 21 of mounting frame 20 are preferably hollow to accommodate the storage of oil as shown at 29, the end members thus constituting hollow sumps. It may be desirable, for purposes of control, to mount liquid level floats 30, which are attached to float rods 31 within the hollow sump area of end plates 21, thus providing an indication of the amount of oil which has accumulated. This will allow pump mechanisms, not shown, to remove oil automatically or manually, from the sump, providing the capability for effecting buoyancy, draft in the water of the entire unit, and by the same measure, to control its weight and thus its inertia or "bounce" in meeting waves. Lower horizontal frame members 22 may also be hollow and by apertures, not shown, allow access to the interior of end plates 21, thus to accommodate a larger amount of recovered oil.

Thus, the slide and guide mechanism shown provides restraint fore and aft, while allowing freedom of movement in heave and roll, relatively independent of ship motion. The generally circular embossments or slides 28 keep a constant length between mounting channels which, because of their flexible spring mounting, accommodate expansion and contraction of the distance between the support members 1.

As best understood by referring to FIG. 4, a buoyancy chamber 40 is provided between end plates 21 within mounting frame 20. This buoyancy chamber is desirably filled with a buoyant material which may, for example, be unicellular polyurethane "foam" or other suitable material generally indicated at 41 in the drawings. Chamber 40 is generally circular in cross section and is rigidly secured to and between end plates 21 by means of end walls 42 which are provided with a flange 43 which is secured to the inner surface of end plate 21.

Figure 5:
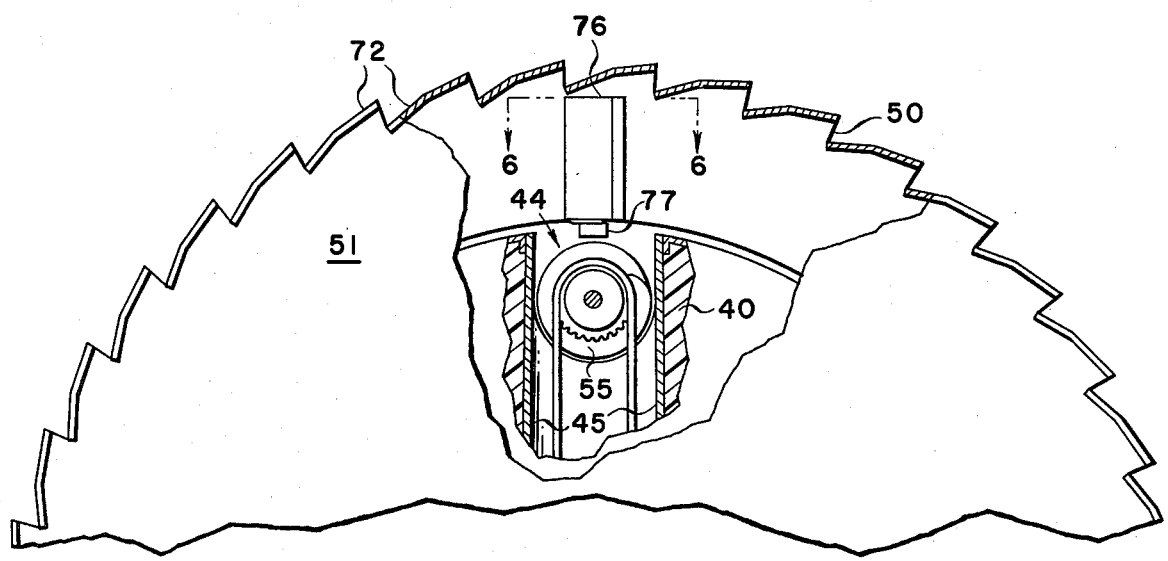
FIG. 5 is a view taken along line 5—5 of FIG. 4.
Figure 6:
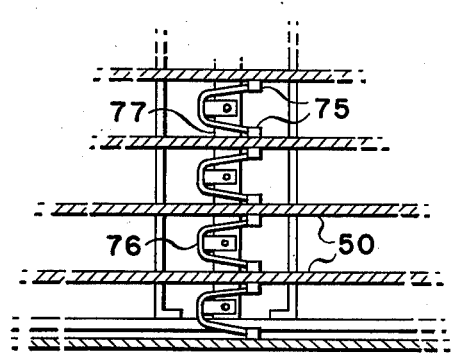
FIG. 6 is a view taken along line 6—6 of FIG. 5.

As best shown in FIG. 5, buoyancy chamber 40 is provided with a trough 44 near the top center of chamber 40, trough 44 being formed by a wall 45 which, as shown, is open at the top, thus constituting a discontinuity in the surface of the buoyancy chamber 40. It should be understood that buoyancy chamber 40 is rigidly secured to end plates 21 and does not rotate.

Details of disc drum unit 10 are best shown in FIG. 4 and are seen to comprise a plurality of generally vertically disposed discs 50 which are made of oleophilic surface material, desirably aluminum. It should be understood, however, that this material may be any material suitable to meet structural requirements and, if the material is not oleophilic, may be provided with an oleophilic coating or outer surface in a manner clear to one skilled in the art.

Discs 50 are each provided with large central apertures. End discs 51, provided as ends of disc drum unit 10, are substantially continuous except for relatively small holes in the middle to accommodate mounting of disc drum 10 around flange 43, which is connected to end plate 21 as well as providing a passage for oil from trough 44. This mounting is desirably accomplished by providing an adapter 52 which is bolted to end discs 51 and journalled in a bearing member 53 to provide for rotation of the disc drum unit.

It will be seen that buoyancy chamber 40 occupies an area within the generally cylindrically shaped cavity formed by the large holes in discs 50.

A conveyor 55, which may desirably be a "screw" type conveyor, is rotatably journalled at both ends into end walls 42 of buoyancy chamber 40. Conveyor 55 is mounted in trough 44 and power is supplied to turn the conveyor by means of motor 56 which is attached by drive chain 57 through sprockets 58 mounted on idler shaft 59. One end of idler shaft 59 is journalled in the outer wall of end plate 31, and the other end is attached to the end wall 42 of buoyancy chamber 40. A second drive chain 60 is used to complete the transmission of power to conveyor 55.

In like manner, power is transmitted from motor 56 through drum drive chain 70 which is attached to a drive sprocket 71 attached to disc drum 10 by being secured to end disc 51. Thus, the same motor 56 may, if desired, be used to rotate disc drum 10 as well as to operate conveyor 55 located in trough 44.

A plurality of wipers 75 are mounted by means of wiper springs 76 to a wiper support bar 77. Wipers 75 are thus urged into biased engagement with the surface of discs 50.

Discs 50 are separated from each other and are held in place by means of horizontal vanes 72 which desirably are adapted to interlockingly engage with slots in discs 50 to produce a rigid structure characterizing the disc drum 10. Vanes 72 are mounted at an angle to accommodate the entry of oil into the disc area in the manner shown in the aforementioned Yates patent.

ASSEMBLY

A procedure for assembling the unit would preferably consist of assembling conveyor 55 into trough 44. Discs 50 are then assembled around buoyancy chamber 40 and discs 51 are journalled onto buoyancy chamber 40 by means of flanges 52 (which may desirably be separate collars). Vanes 72 are then secured into place on discs 50 and 51. It is noted that prior to installation of the last two or three vanes, wipers 75 are installed. Thereafter, buoyancy chamber 40 with the disc-drum 10 journalled thereon is secured to end plates 21. It may be desirable to facilitate accessibility to the journaling mechanism to provide "windows" or access doors (not shown) in both walls 21a and 21b or end plate 21. This allows accessibility into the area in which the mechanism is assembled and accommodates the placement of bolts, collars, and the like.

OPERATION

Power supplied by motor 56 is transmitted by means of drive chain 70 through sprocket 71 to cause rotation of the disc drum 10. As the discs are rotated into the interface of oil and water, oil adheres to the discs and is brought to the area at the top of the discs which is wiped by wipers 75. Oil thus wiped from the surface of the discs falls by gravity into trough 44 located in the (non-rotating) top of buoyancy chamber 40 wherein conveyor 55 transports it through trough 44, and into the sump in end plate 21. It should be noted at this point that one or more motors 56 can be used, and they may be hydraulic or electric. To accommodate the use of oil sumps in both end plates, conveyor blades with opposite pitches may be used, thus to urge oil away from the middle and into the respective sump chambers. In like manner, separate conveyors, whether or not powered by separate motors, could be used to accommodate the same result. As oil accumulates in end plates 21, buoyancy of the entire unit is substantially affected, enhancing control of the dynamics of the disc drum and mounting frame as indicated hereinabove.

Flotation provided by buoyancy chamber 40 located within disc drum 10 provides self-contained buoyancy for the unit which allows it to operate relatively independently of its mounting platform in heave and roll. Applicant's current design calls for a disc diameter of approximately 8 feet, and an assembly of discs extending approximately 16 feet.

Obviously, various methods of cascading the installation of disc drums, one behind the other, or in an articulated manner extending many feet, can be envisioned.

Sought after advantages of the unit are realized by mounting an oil receiving trough substantially higher, and over, wave surfaces than was previously possible, thus further isolating recovered oil from blown spray and waves, resulting in a higher percentage of oil to water mix actually recovered. This of course results in lower costs in later separating oil from water, minimizing the necessity of transporting a higher percentage of water in the recovered material, and thus an overall more highly efficient operation.

Mounting frame 20 and disc drum 10 are thus shown to be flexibly installed within the area between the supports 1. In some applications it may be desirable to provide a davit structure to lift disc drum 10 from mounting channels 24 for storage on deck or in another area out of contact with water. Similarly, it may be desirable to provide stop means or locking means to securely fasten disc drum 10 within its channel to the supporting structure. Such mounting is considered to be within the skill of one familiar with the art.

Variations in structure may be contemplated for the device herein described and the appended claims are to be interpreted as inclusive of all variations within the skill of one familiar with the art.

We claim:

1. A device for separating fluids of differing physical properties comprising
   a group of coaxial, generally vertically disposed, interconnected discs having oleophilic surfaces,
   an aperture in each of said discs,
   means for rotatably mounting the end discs of said group onto a support,
   a closed buoyancy chamber attached to said support, journaled within and extending through the apertures in said discs,
   an upwardly facing trough in the upper periphery of said buoyancy chamber,
   a plurality of spring biased wiper blades pressed into wiping engagement with the surfaces of said discs, said wipers being mounted on said buoyancy chamber between the top portions of said discs, whereby oil wiped from the surfaces of the discs will fall into said trough, and activating means for providing rotational movement to said discs relative to the liquids to be separated.

2. A device for separating fluids as claimed in claim 1 and in which said support constitutes
   a mounting frame attached to said buoyancy chamber,
   said discs being rotatably journalled onto said mounting frame,
   said mounting frame comprising a pair of end plates, the lower portion of at least one of which is hollow,
   a conduit connecting at least one end of said trough with the interior of said hollow area in its respective end plate, said hollow area thus constituting a reservoir for fluid removed from said discs.

3. A device for separating fluids as claimed in claim 2, and including conveyor means journalled within said trough for urging material placed in the trough into said reservoir.

4. A device for separating fluids as claimed in claim 2 and in which said trough is located above the center of rotation of said discs and at the top surface of said buoyancy chamber.

5. A device for separating fluids having differing physical properties comprising
   a plurality of substantially vertically disposed oleophilic discs,
   said discs being secured in spaced relationship one from the other by a plurality of vanes extending generally at right angles to said discs and secured to said discs,
   each of said discs except the two end discs, having a large aperture therein concentric with the axis of rotation,
   a closed buoyancy chamber extending through the aperture in each of said discs,
   said end discs being rotatably journaled upon said buoyancy chamber,
   an open trough located in the upper periphery of said buoyancy chamber,
   a plurality of wiper blades mounted on said buoyancy chamber by springs urging said wiper blades into wiping relation with the oleophilic surfaces of said discs, said wiper blades being disposed above said trough so that material wiped from the discs will fall into the trough,
   said buoyancy chamber extending in cross section to cover at least half of the distance between the axis of rotation of said discs and the outer periphery thereof.

6. A device for separating fluids as claimed in claim 5 and which includes
   a mounting frame to which said buoyancy chamber is attached, said mounting frame comprising a pair of end plates,
   at least one of said end plates being hollow,
   a plurality of generally horizontally disposed frame members secured to each of said end plates holding the same in spaced relationship,
   at least the forward and rearward sides of said frame being substantially completely open.

7. A device for separating fluids as claimed in claim 6 which includes
   mounting means associated with said mounting frame, said mounting means comprising
   an arcuate segment generally vertically disposed on the outer face of each of said end plates,
   a mounting channel slidably journalled over each of said arcuate segments,
   and a plurality of springs attached to the outer base surface of said mounting channel.

8. A fluid separation device as claimed in claim 7 and in which a conveyor is rotatably mounted within said trough in said buoyancy chamber thus to urge oil out of said trough and into the reservoir in said end plate.

9. A device for separating fluids of differing physical properties in rough water environments comprising
   a plurality of generally vertically disposed discs having oleophilic surfaces, said discs being mounted in spaced vertical relationship one to the other by
   a plurality of vanes attached to said discs and extending parallel to the axis of rotation thereof,
   a large aperture in each of said discs except the end discs, said apertures in cross section extending at least one-half the distance between the axis of rotation of said discs and the outer periphery thereof,
   a buoyancy chamber extending through the aperture in each of said discs,
   mounting means on each end of said buoyancy chamber journalling the end discs for rotatable movement about said chamber,
   a trough formed in the upper peripheral surface of said buoyancy chamber,
   a plurality of wiper blades mounted on said buoyancy chamber and extending radially in wiping contact with the upper portion of said oleophilic surfaces whereby material wiped from said surfaces will fall into said trough, a mounting frame having two end plates, said end plates beng rigidly attached to said buoyancy chamber, at least one of said end plates containing a hollow reservoir in the lower portion thereof, a conduit connecting said reservoir with the trough in said buoyancy chamber, a plurality of horizontal frame members rigidly attaching said end plates in spaced relation to each other, at least the lower portions of said forward and rearward sides of said mounting frame being open to allow fluids to ingress and egress the area within said frame occupied by the discs, an arcuate embossment extending vertically from near the top to near the bottom of each of said end plates, a U-shaped channel journalled over a portion of the arcuate surface of said embossments thus providing a channel in which the embossments are free to vertically move, a pair of, spaced apart, generally vertical, support members, a plurality of springs attached to the base legs of said channels and to the surfaces of said support members, and means for removing fluid from the reservoir in said end plate.

10. A device for separating fluids of differing physical properties as claimed in claim 9 and including buoyant unicellular foam substantially filling said buoyant chamber, motive means mounted on said frame and connected to said discs to provide rotation thereof, and motive means connected to said conveyor for urging fluid in said trough through said conduit and into said reservoir.

* * * * *